Oct. 6, 1925.   1,556,288
R. G. LEDIG
COMBINATION GUARD AND UTENSIL SUPPORT FOR ELECTRIC COOKERS OR TOASTERS
Filed March 9, 1922
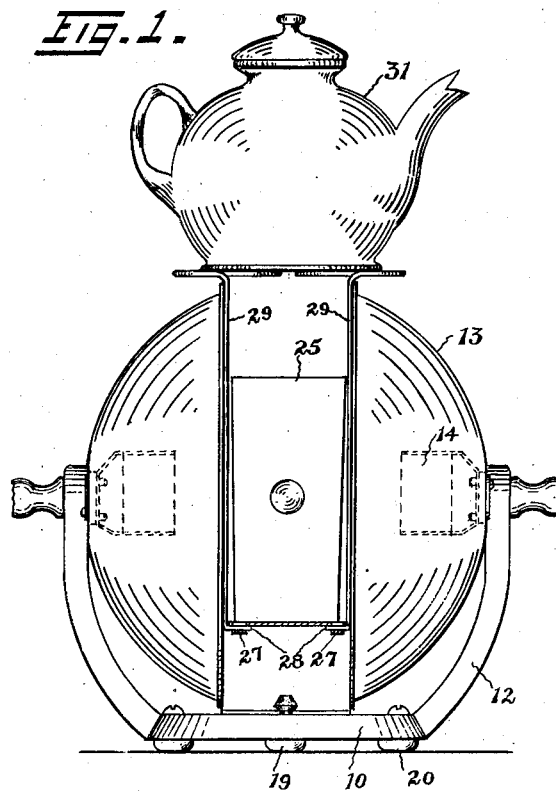
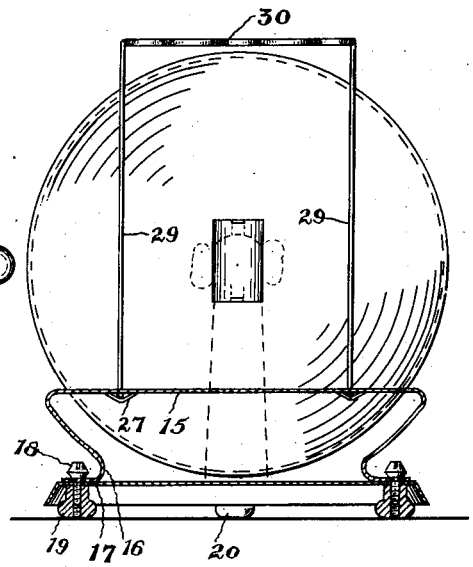
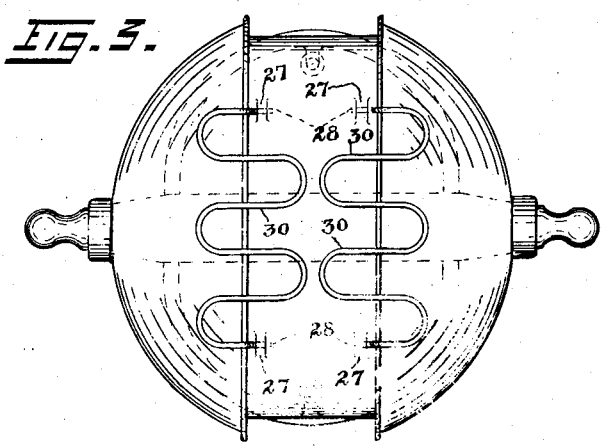
Witnesses:
Inventor:
Richard G. Ledig;
By his atty, Patented Oct. 6, 1925.

1,556,288

UNITED STATES PATENT OFFICE.

RICHARD G. LEDIG, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

COMBINATION GUARD AND UTENSIL SUPPORT FOR ELECTRIC COOKERS OR TOASTERS.

Application filed March 9, 1922. Serial No. 542,312.

*To all whom it may concern:*

Be it known that I, RICHARD G. LEDIG, a citizen of the United States, residing in Philadelphia, in the county of Philadelphia and State of Pennsylvania, have invented certain new and useful Improvements in Combination Guards and Utensil Supports for Electric Cookers or Toasters, of which the following is a specification.

This invention relates to supports for food receptacles for use with multiple reflector electric heaters or toasters of the type shown in the United States application of August Mottlau, filed Feb. 17, 1922, Serial No. 537,289 for electric cookers or toasters; though it is noted that the invention is not limited to supports nor in some respects even to electrical devices.

One object of the invention is to provide a support of this kind for supporting an additional vessel or utensil to utilize waste heat that would otherwise be lost.

Another object of the invention is to provide a support of this kind provided with standards which will prevent the receptacle normally used with heater from coming in contact with the heating units.

Other objects of the invention are to improve generally the simplicity and efficiency of such devices and to provide a device or apparatus of this kind which is durable, economical to manufacture and operate, which will not easily get out of order.

For the accomplishment of these and other objects my invention is shown in combination with an appliance which, briefly stated, comprises a base on which are mounted opposed reflectors and heating units and a platform disposed between the units for carrying a narrow receptacle. The support forming the subject matter of the present invention is provided with standards supported on said platform and carrying a relatively broad supporting rack above the reflectors.

Other objects of the invention will appear as the description proceeds; and while herein details of the invention are described, the invention is not limited to these, since many and various changes may be made without departing from the scope of the invention as claimed.

In the accompanying drawing, showing by way of example several of many possible embodiments of the invention, Figs. 1 and 2 are respectively front elevation and transverse section of an electric heater or toaster showing my improved support and a receptacle thereon; and Fig. 3 is a plan of the same.

The heater of the said application comprises a main base 10 supporting a pair of outwardly curved bracket standards 12 secured to diametrically opposite points of the edge of the base and carrying at the upper ends a pair of substantially parabolic axially horizontal coaxial opposed heat reflectors 13, and heating units 14 mounted on said standards substantially in the focus of the reflectors and connected by conductors (not shown herein) passing through said standards to a suitable source of current.

A platform 15 disposed diametrically across and spaced above the main base 10 between the reflectors is provided with downwardly and inwardly and horizontally outwardly turned ends 16 forming feet provided with outwardly opening notches 7 removably received under the heads of screws 18 carried by the base 10 and holding in place feet 19 cooperating with additional feet 20 to support the base.

The normally used receptacle, toaster or other utensil 25 is placed on the platform 15 and is adapted to hold any suitable material in position to be cooked or heated from both sides simultaneously by heat rays from both of said reflectors and units. The sheet metal comprising said platform 15 is provided with a plurality of slitted and downpressed portions 27 between which and the platform are received the in-turned ends 28 of side members 29 of a pair of wire wickets formed at the upper part with sinuously disposed portions in a horizontal plane together forming an upper support 30 for a receptacle 31 or other utensil. Said side members 29 are adapted to guide therebetween the vessel 25, utensil or other article in position to be heated on both sides thereby to hold such utensil out of contact with said reflectors and units.

The operation of the device is very simple. Material to be heated is placed in the receptacle 25, the receptacle or the like is then put in place between the reflectors either before or after the current has been turned on. Liquid or other material is placed in the vessel or utensil 31 which is placed on the support 30, in position to be heated on the bottom by stray heat and convected heat from between said reflectors and units through the interspaces of the support 30.

The support 30 is particularly useful for keeping things hot while other articles are being cooked in the receptacle 25; though of course the support 30 may be used alone. The support 30 may be removed by forcing the in-turned ends from the down-pressed portions 27.

I claim:

1. An appliance comprising a reflector; a heating unit near the reflector; a receptacle-receiving supporting-platform near the reflector and unit and provided with sockets; and upstanding side members provided with turned ends received in said sockets formed with an upper support above said platform and higher than the reflector in position to be heated from beneath.

2. An appliance comprising a pair of opposed concaved reflectors; a heating unit approximately in the focus of each reflector; a receptacle receiving supporting platform between the reflectors and units and comprising a sheet metal support provided with a plurality of slitted and down-pressed portions; and upstanding side members provided with in-turned ends removably received between the platform and said portions and formed with sinuous portions forming an upper support in position to be heated from beneath by heat from between said reflectors.

3. An appliance comprising a pair of opposed concaved reflectors; a heating unit approximately in the focus of each reflector; a receptacle-receiving supporting-platform between the reflectors and units; and an additional support over said platform.

4. An appliance comprising a pair of heating means; a platform for holding material to be heated between said means and comprising a sheet metal support provided with a plurality of slitted and down-pressed portions; and upstanding side members provided with in-turned ends removably received between the platform and formed with an additional support over said platform.

5. An appliance comprising a pair of opposed concaved reflectors; a heating unit approximately in the focus of each reflector; a removable receptacle-receiving supporting-platform between the reflectors and units; and an additional support over said platform.

6. An appliance comprising a pair of heating means; a platform for holding material to be heated between said means and comprising a sheet metal support provided with a plurality of slitted and down-pressed portions; and upstanding side guide members provided with in-turned ends removably received between the platform and said portions.

7. An appliance comprising a pair of heating means; a platform for holding material to be heated between said means; and upstanding side members provided with in-turned ends removably received on the platform and formed with sinuous portions forming an upper support in position to be heated from beneath by heat from between said means.

RICHARD G. LEDIG.